United States Patent [19]

Kadakia et al.

[11] 4,000,460
[45] Dec. 28, 1976

[54] DIGITAL CIRCUIT MODULE TEST SYSTEM

[75] Inventors: Virendra Kirtanlal Kadakia, Huntington Beach; Charles Philip Holt, Jr., Rancho Palos Verdes; Ralph Crittenden Moore, Jr., Cypress, all of Calif.

[73] Assignee: Xerox Corporation, Stamford, Conn.

[22] Filed: July 1, 1974

[21] Appl. No.: 484,473

[52] U.S. Cl. .................. 324/73 R; 235/153 AC
[51] Int. Cl.² .................................. G01R 15/12
[58] Field of Search ........... 324/73; 235/153 AC

[56] References Cited
UNITED STATES PATENTS

| 3,219,927 | 11/1965 | Topp, Jr. et al. | 324/73 R |
| 3,581,074 | 5/1971 | Waltz | 324/73 R X |
| 3,621,387 | 11/1971 | Smith et al. | 324/73 R |
| 3,651,315 | 3/1972 | Collins | 324/73 R X |
| 3,673,397 | 6/1972 | Schaefer | 324/73 R X |
| 3,812,426 | 5/1974 | Illian | 324/73 R |

OTHER PUBLICATIONS

Williams, Michael "Enhancing Testability of Large Scale Integrated Circuits . . . " Report No. SU-SFL-7-0-065, Stanford Elect. Labs. Sept. 1970.
Krosner S. P. et al. "Logic Card Tester" IBM Technical Disclosure Bulletin, vol. 14, No. 4, Sept. 1971, pp. 1242–1243.
Millham, E. H. et al. "Logical Assembly Testing System" IBM Technical Disclosure Bulletin vol. 14 No. 11 Apr. 1972 pp. 3446–3449.

*Primary Examiner*—John K. Corbin
*Assistant Examiner*—Rolf Hille
*Attorney, Agent, or Firm*—James J. Ralabate; Michael J. Colitz; Franklyn C. Weiss

[57] ABSTRACT

Apparatus is provided for automatic production testing of large digital circuit modules. A test station, under computer control, applies test bit patterns and clock pulses to the module under test, analyzes the resultant outputs, and isolates any fault found to one or several IC's. The test station contains power supplies and air cooling for the module, and a keyboard display and printer for use by the test operator. Test programs are developed off-line and are loaded from magnetic tape into a disk pack where they are available to the computer. The flip-flops on the module to be tested are used as an extension of the test station through the addition on the module of circuitry to allow the flip-flops to be reconfigured from their normal circuit configuration into a shift register connected at one end to one of the module connector pins. Thus, before a test begins, these flip-flops, in a shift register configuration, may be loaded with test data and then configured back into their normal circuit configuration for the actual test. In this manner, test data may be loaded onto a module either in series into the shift register thus produced, or in parallel onto the module connector pins.

6 Claims, 14 Drawing Figures

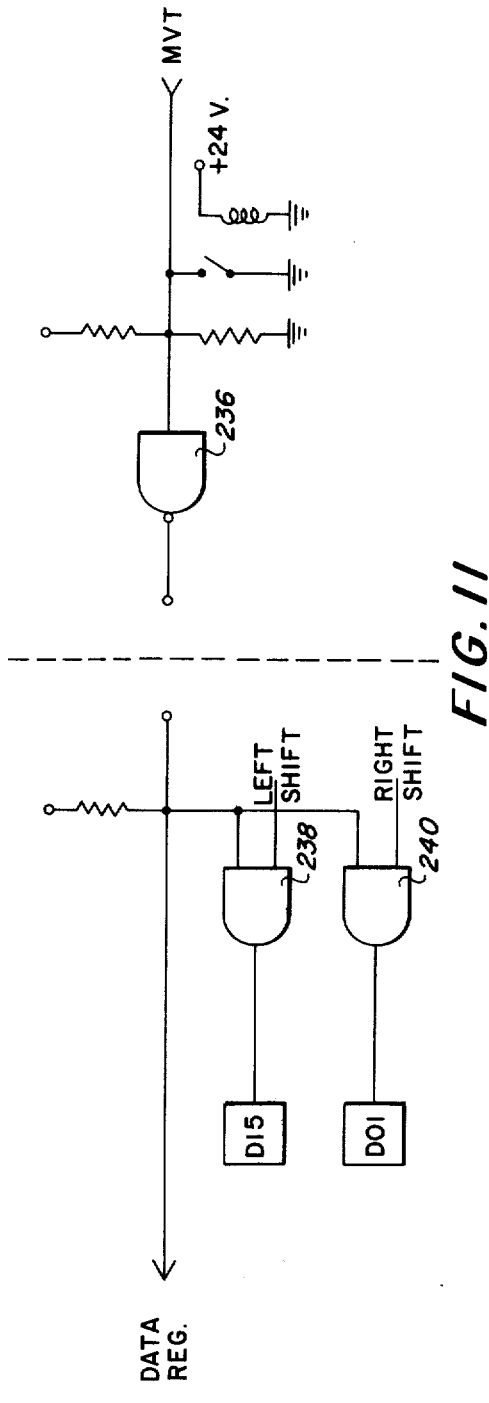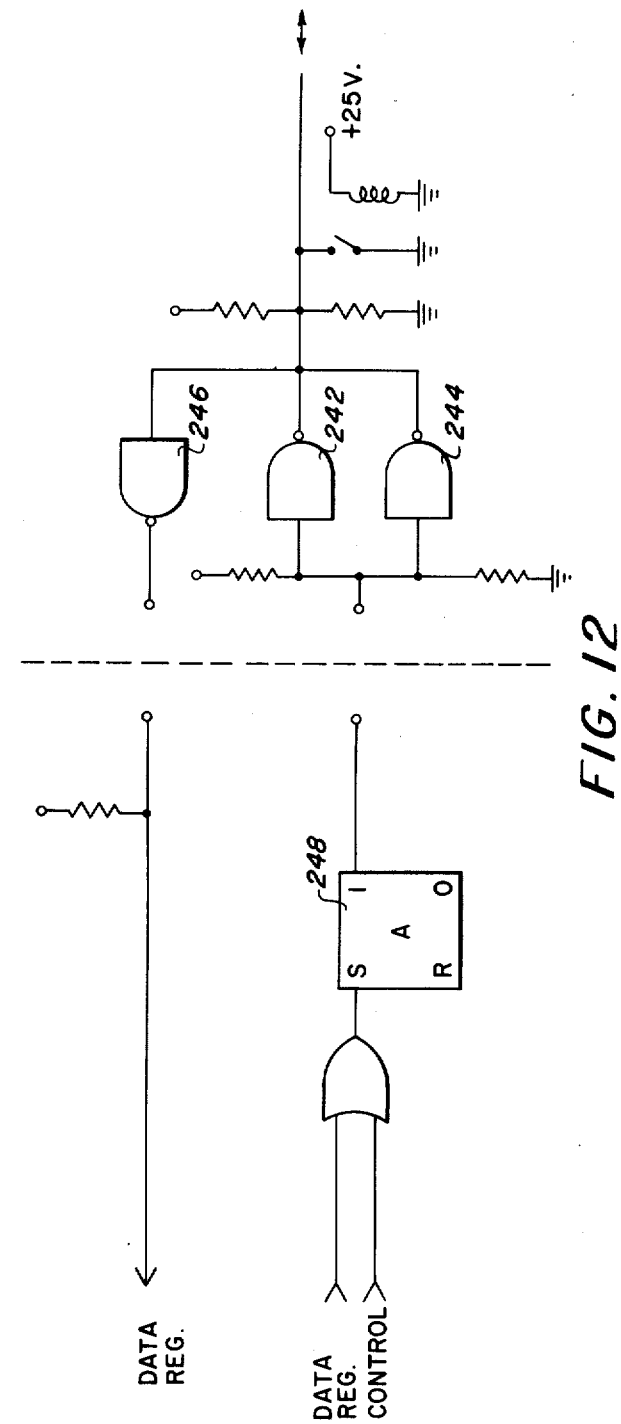
FIG. 11
FIG. 12

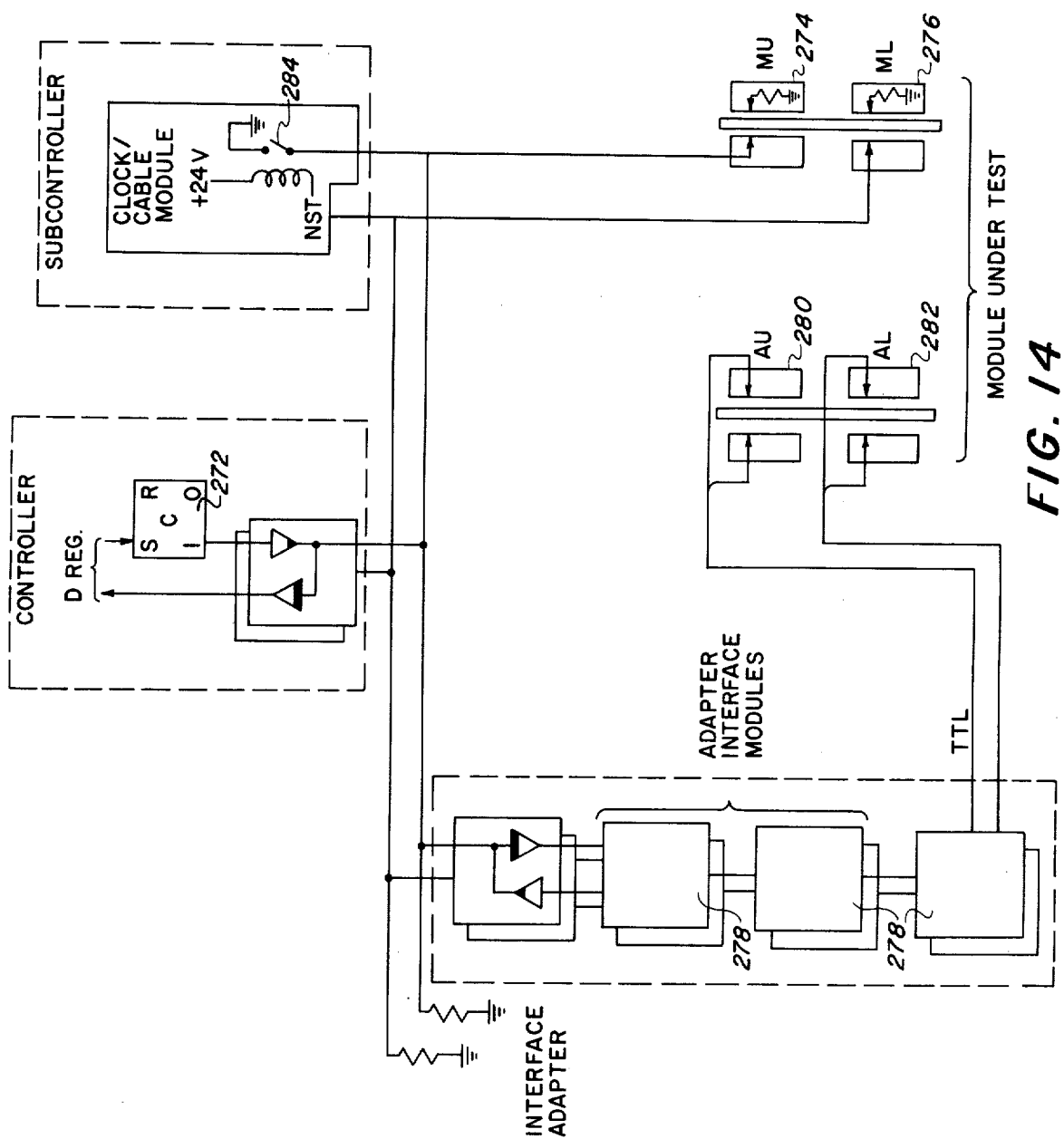

DIGITAL CIRCUIT MODULE TEST SYSTEM

BACKGROUND OF THE INVENTION

The present invention relates to automatic test equipment for the production testing of large digital circuit modules.

Recent advances in digital circuit technology have led to the widespread manufacture and use of "motherboard" circuit modules typically containing approximately 150 integrated circuit (IC) chips mounted to dual-in-line packages contained on large printed circuit boards typically of approximately 200 square inches. Because of their large size and complexity, and because of the absence of test points or connector pins communicating with circuits that may be several logic levels away from either a module input or module output pin, it is only with extreme difficulty and at considerable expense in time and money that a board of this kind may be tested and a fault diagnosed down to a particular defective IC during production testing without the use of various diagnostic aids that have been developed in the industry.

The problems of testing large and complex logic circuits may be separated into two categories, those involving the testing of combinational logic systems and those involving the testing of sequential logic systems.

A combinational logic system is defined as one that consists entirely of gates (AND, OR, NAND, NOR, and Exclusive OR). In a combinational logic system no clock is required and after the inputs have been established, and disregarding settling time, the outputs are immediately available. For small circuit modules it is appropriate for a test programmer, after studying the schematics of the circuit module, to create test patterns and to write test programs so that automatic test equipment, under control of a computer executing these programs, can apply these test patterns to the circuit module, monitor one or several output pins, determine if the test failed, and write out a repair order on a suitable computer printer if the test failed. These test programs were written to exercise one gate or one flip-flop at a time or to completely test one gate or one flip-flop before using it to supply an input to a second gate or flip-flop to be tested, so that whenever a failure occurred, it would be immediately obvious which circuit had failed and the repair order could be printed immediately. Upon the detection of a fault, the test program would terminate, the particular gate or flip-flop would be repaired, and the board would be reinserted into the test equipment for retest. When all faults were repaired the test program would be completely executed with no faults detected. With the advent of large circuit modules of the kind specified above, this simple test system could no longer be used for several reasons.

In a large digital circuit module with approximately 150 IC's, it has been calculated that approximately 9,000 test patterns would be required to fully test such a system and diagnose a fault down to an IC if a fault were detected. This work could not be done by a test programmer for two reasons. First, the time it would take for a test programmer to generate that many patterns and produce a program to execute those patterns and to diagnose any combination of faults down to an IC whose failure would produce that particular combination of faults would require an excessive amount of time and therefore, would involve a large expense in the production of the circuit board. Using this kind of system a circuit board could not be produced at a competitive cost. Furthermore, because of the tediousness of the work and the complexity of the circuit, the patterns thus generated would contain errors which would detract immediately from the usefulness of the program in that one would never known whether the board was being fully tested, and would result in a large amount of follow-up corrective work on the programs in inventory.

More recently, computers have been used to automatically generate test bit patterns for testing and diagnostic purposes. First, the entire circuit must be coded in a form that is recognizable by the computer. This can be done by reducing all of the digital circuits on the board to their logic equation form. This information may already be available to the test programmer on a data base originally generated for the simulation of a digital circuit or for automatic pin listing, back plane wiring, or circuit board etching equipment. A computer can then, using one of several algorithms developed for the purpose, analyze the digital circuit, node by node, and determine a unique logical path from the module input pins to a module output pin that will test each particular point or node of the logical circuit, determine what input bit pattern must be applied to all other input pins to block off the interaction from all other logic circuits on the module, determine what input bits are required to test that particular circuit node, and determine on which particular module pin the output may be tested.

A test of this kind could be applied to every node on the entire logic module. However, if peripheral circuits on the module must be set up in a non-interfering state in order to test a particular node and if a fault in one of these peripheral circuits will result in a test failure, then each test must of necessity test more than one circuit node. A program written to take advantage of this characteristic may be used to make a large reduction in the number of tests necessary to completely test and diagnose one circuit module. A method of computing the minimum set of patterns required to test a combinational logic system, and including a method of generating the patterns for testing such a system, is described in "A Method To Compute A Set Of Fault Detection Tests For Combinational Nets" by Virendra K. Kadakia, published in June, 1967 by the Polytechnic Institute of Brooklyn.

The next major problem to be overcome in the generation of test patterns according to the system described above is that in actual circuits our rarely finds a pure combinational net. Because sequential circuits, usually in the form of flip-flops, are almost always interspersed through the circuits making the testing of these circuits impossible by standard combinational net methods. That is to say, to test such a mixed logic system one must not only need to know the input bit pattern but also the states of the sequential logic elements, and furthermore, must provide clock pulses and known how many clock pulses have been received by these sequential logic elements before the output has been inspected.

One method of testing a circuit module containing a mixture of combinational and sequential elements is to redesign the module by adding enough additional circuitry so that all of the sequential elements, upon the receipt of a suitable test signal at a module input pin, may be connected together as one large shift register.

This usually does not require substantial additional circuitry since, for most ordinary uses, the standard integrated circuit shift register may be loaded either in parallel or through a shifting operation so that this standard shift register in its serial mode may be used as the shift register and in its parallel mode may be used as a collection of individual flip-flops by the circuit. In this case, the only additional logic that would normally be required would be multiplexors for passing data into and out of these shift registers and a control line to control the integrated circuit into either its parallel or serial mode of operation. Also, two connector pins would have to be added to the module, one for the control line input and one for the data input/output.

Using this shift register technique in the testing of sequential and combinational elements on a circuit module, the test process would be as follows. Generally, the flip-flops on the module would be tested first. If they pass the test successfully then they will be considered an extension of the test station and used to test the remaining combinational logic. Specifically, to initially test the sequential elements, all of the flip-flops on the module are connected in shift register configuration by an appropriate signal on the control line, and then serially loaded with a test pattern. This test pattern is then serially unloaded back out to the test station. With the operation of the shift register elements thus verified, the flip-flops may now be used as test points on the module. A test pattern is now applied to a particular combinational net. This pattern is either applied to the module connector pins or is shifted into the shift register. The control line then reconnects the sequential elements into their original flip-flop circuit functions, and after settling time, the network output signal appears either at a module output pin or at the input to a flip-flop. If the output bit is available at a module connector pin it is simply passed along to the test station for analysis. If the bit is available as an input to a flip-flop, a clock is issued to the module, clocking the bit into the flip-flop. All flip-flops on the module are then reorganized into a shift register and the data bit is shifted out serially to the test station. This technique not only allows for the automatic testing of circuit modules with intermixed sequential and combinational elements, but also, in effect, provides for a multiplicity of test points scattered through the internal logic of the module in that any flip-flop may be used as either an input or an output test point.

The technique of testing sequential elements initially by interconnecting them as a shift register and then using these same sequential elements as additional input and output test points to test the remaining combinational logic is described in an article by Michael J. Y. Williams entitled, "Enhancing Testability of Large Scale Integrated Circuits Via Test Points and a Additional Logic" published by Stanford University, September, 1970.

Given a module containing built-in diagnostic shift registers as described above, and assuming the automatic generation of the required nine thousand sets of bit patterns per module necessary for complete fault detection and diagnosis wherein each bit pattern may range over 100 bits, there remains a need for a test system that will exercise the module according to these pre-calculated bit patterns, test the module and diagnose any problem found down to a replaceable unit. Furthermore, this system must be suitable for operation by relatively untrained factory personnel and operate at speeds to allow for economical production testing.

SUMMARY OF THE INVENTION

The Digital Circuit Module Test System described herein consists of a Test Station containing a Fixture into which the Module Under Test is inserted, a Computer, a Test Station Controller under Computer control, a Keyboard Display to allow the test operator to communicate with the System, two Printers to allow the Computer to print out messages and repair orders to the test operator and Magnetic Tape and Disk Pack units to allow for the acquisition and mass storage of test programs. The Computer and Magnetic Tape and Disk Pack units are capable of supporting three Test Stations running simultaneously in a time sharing mode. In this mode of operation each Test Station will have its own Keyboard Display, Printer and Controller. The System is capable of testing a large scale circuit module in approximately 2 to 4 minutes, will usually diagnose a fault down to a replaceable unit (IC), display all of the test and diagnosis information on the Keyboard Display and print out a hard copy repair order on the Printer.

A test program for a digital circuit module, along with its set of test patterns, is produced off line by a series of programs operating on the digital circuit data base. These programs are brought to the digital circuit module test system on magnetic tape and are loaded through the Magnetic Tape unit into the Disk Pack for permanent storage. When this particular Module is inserted in the Test Station Fixture and the operator calls for the corresponding program through the Keyboard Display, the program will be loaded from the Disk Pack into the Computer and executed, thereby testing and diagnosing the Module Under Test.

Because the Computer can be run in a time sharing mode the three Test Stations may be testing three different Modules simultaneously or any one of them may be running in a different mode from any other, such as automatic, loop on failure, or self-test.

To accomplish these functions each Test Station is equipped with programmable Power Supplies to allow margined voltages to be applied to the Module Under Test, relay switching at the test fixture to allow for application of power or to test for open or shorted Module connector pins, a clock generation system and forced air cooling to preserve the Modules operating environment.

It is therefore an object of this invention to provide a Digital Circuit Module Test System for the automatic testing of large and complex digital circuit modules by relatively untrained production personnel at economical speeds.

BRIEF DESCRIPTION OF THE DRAWINGS

FIG. 11 shows the circuit for serial loading of the Data Register from the Module Diagnostic Shift Register.

FIG. 12 shows the circuits used to load the diagnostic pins of the Module.

FIG. 14 is a schematic of the Connector Board.

DETAILED DESCRIPTION OF THE INVENTION

Figure 1:
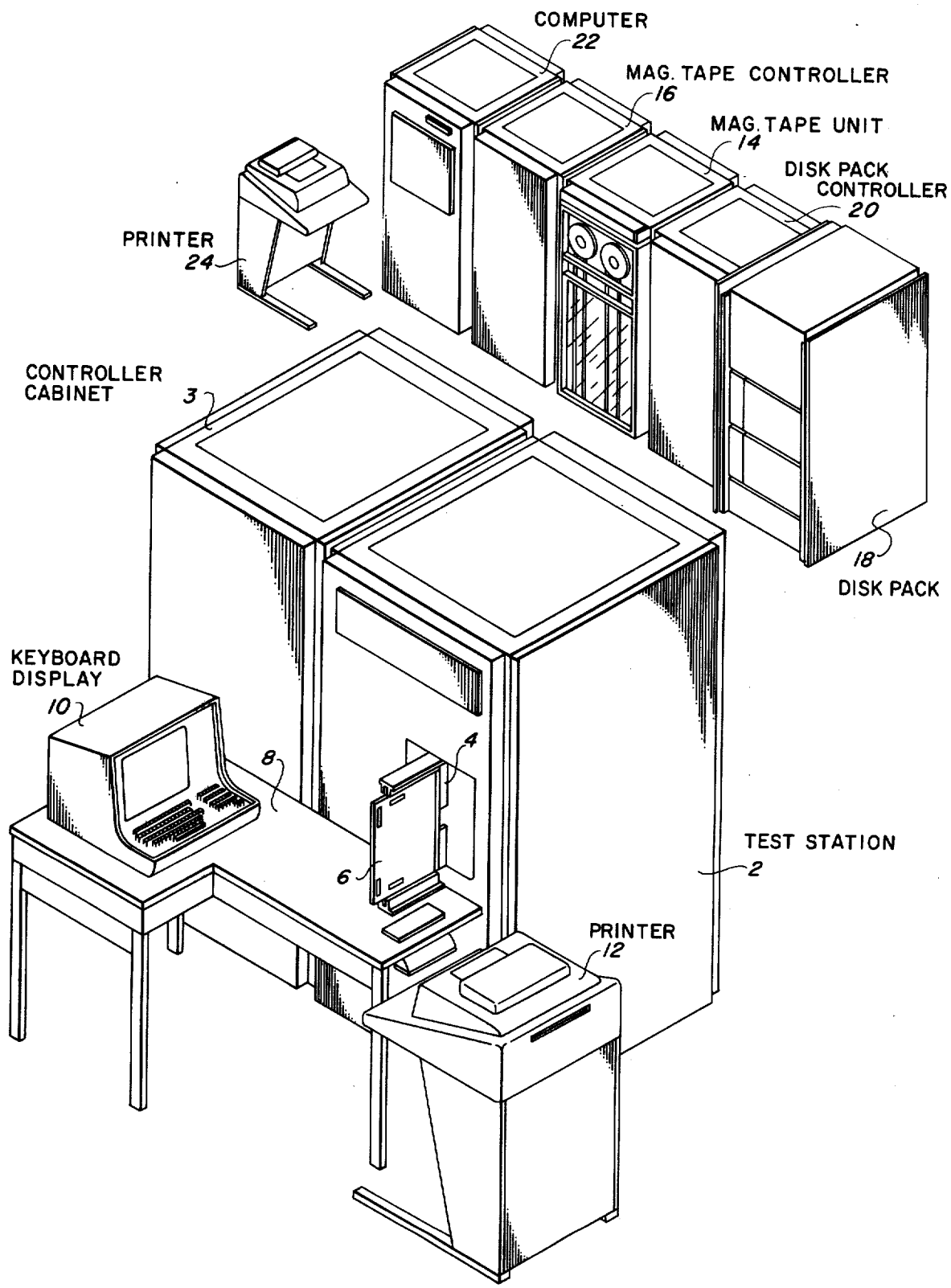
FIG. 1 is a perspective view of the major Test System Assemblies.

The equipment required for the implementation of the preferred embodiment of the Digital Circuit Module Test System is shown in FIG. 1 and generally comprises a Test Station 2 which includes a Fixture 4 into which the Module Under Test 6 may be inserted. Each Test Station 2 contains a Subcontroller, Power Supplies and other features which will be described below, and each Test Station has its own Controller contained within the Controller Cabinet 3. The operator sits at the Table 8 and communicates with the system through the Keyboard Display 10. The Printer 12 provides a hard copy output if one is required; for instance, where a hard copy repair order is needed to be attached to the Module Under Test to show that the module had failed and repairs are necessary. There may be up to three Test Stations operating simultaneously, either testing different modules or running under different modes.

Test programs are brought to the system in the form of magnetic tapes which are loaded into the system through the Magnetic Tape Unit 14 which is under the control of the Magnetic Tape Controller 16. These tapes are loaded onto the Disk Pact 18 which is under the control of the Disk Pack Controller 20. The Computer 22 controls the entire system and therefore provides the operating instructions, not only for the Mag Tape and Disk Pack Units but also for the simultaneous operation of the three Test Stations. A second Printer 24 is used by the system operator for communication with the Computer 22.

The Module Under Test 6 is a printed circuit board with an area in the range of 200 square inches and is connected to the Test Station 2 through the Fixture 4. The operator inserts the Module Under Test into the Fixture, and then types in through the Keyboard Display 10 the mode of operation and the part number of the Module. At this point the test will automatically be performed and, in case of failure, a hard copy output will be produced identifying one or several integrated circuits which need be replaced. This information is also displayed at the Keyboard Display 10.

In the preferred embodiment, the Computer 22 is either a Xerox Sigma 3 or a Xerox 530 in that both computers may operate with the same software. In either case, when a particular Module part number is entered into the Keyboard Display 10, that particular test program is loaded from the Disk Pack 18 into the main memory of the Computer 22 and is thereafter executed in normal computer fashion. The instructions are a series of commands and bit patterns which are sent to the Test Station 2 which results in the complete testing of the Module Under Test 6.

In the preferred embodiment new programs brought to the system are loaded from the Mag Tape Unit 14 onto the Disk Pack 18. However, programs may also, under certain conditions, be loaded from the Disk Pack 18 onto mag tape. This is appropriate, for instance, when a dump of the entire Disk Pack program inventory is required. Such a procedure is useful so that a permanent store of the latest programs in inventory may conveniently be made.

The Computer 22 not only commands data transfer from the Mag Tape Unit 14 and from the Disk Pack 18 into its own main memory but also performs a large amount of error checking to constantly monitor the transfer of information from one unit to another.

The system was designed to be operated by a test operator and a system operator. The system operator communicates with the system through Printer 24 and is assumed to know how to load mag tapes and disk packs onto the Mag Tape Unit 14 and the Disk Drive 18 as well as how to control the Computer 22 from its control panel. On the other hand, the test operator, sitting at Table 8, need have no knowledge of the Computer, or of the Module Under Test, since his only function is to enter the Module number and, if necessary, connect the hard copy printed output to the Module and deliver it to the repairman.

Figure 2:
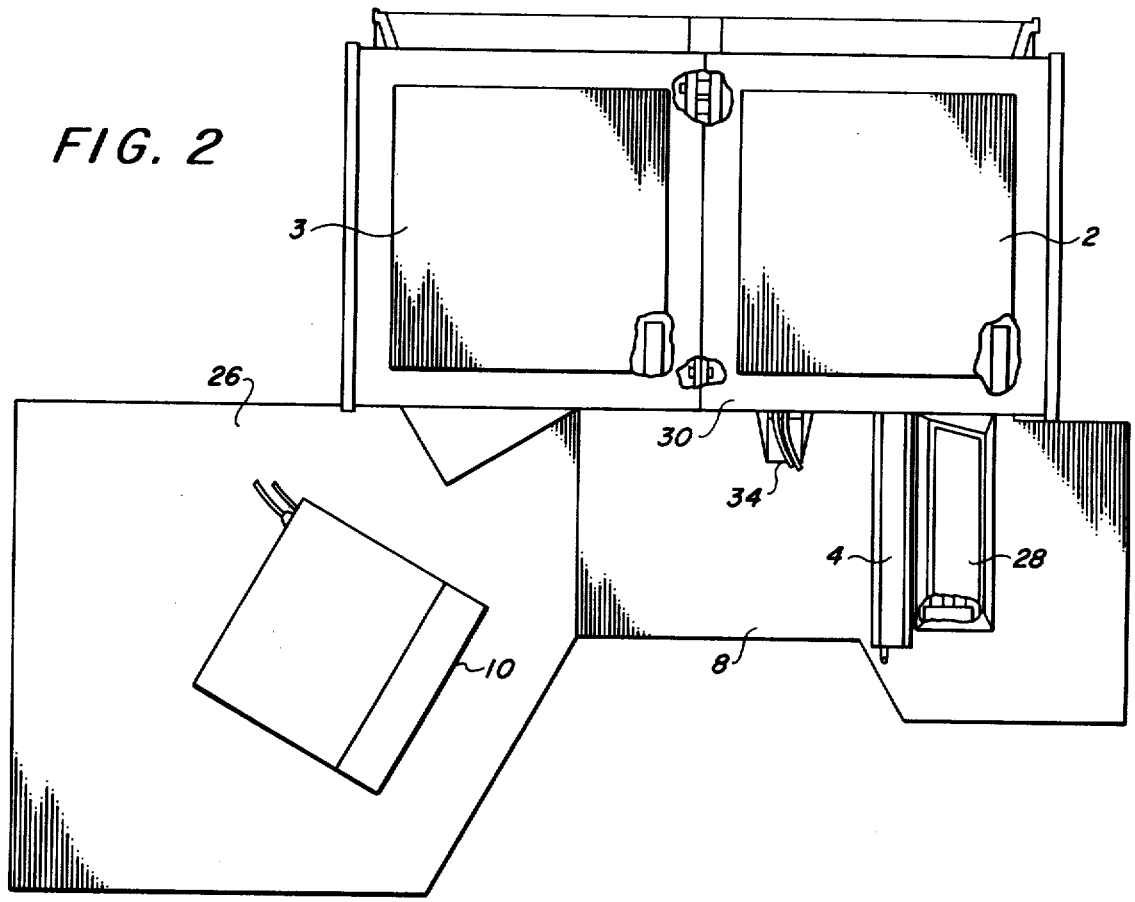
FIG. 2 is a top view of the Test Station including the Test Station Controller Cabinet.

FIG. 2 is a top view of the Test Station 2 or Electronics Cabinet, the Controller Cabinet 3 and associated equipment. The operator sits at the Fixed Table 8 where he can insert a module into Fixture 4, and key information into Keyboard Display 10. Moveable Table 26 can be placed at the convenience of the operator. Air to cool the Module Under Test is delivered from Plenum 28, and Cables 34 to auxiliary connectors on the operator end of the Module Under Test are routed through an opening in the Test Stations's Front Panel 30.

Figure 3:
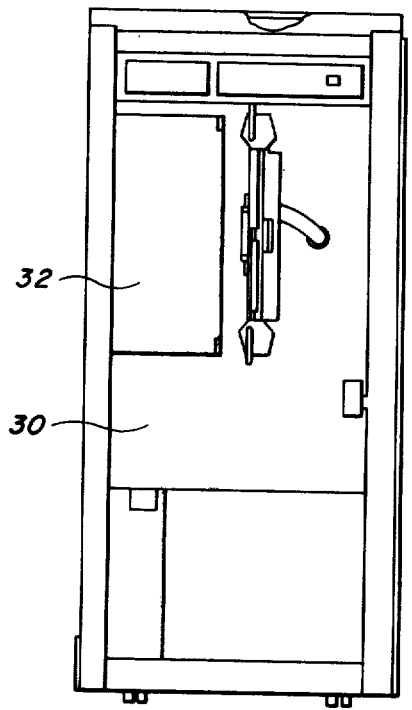
FIG. 3 is a front view of the Test Station or Electronics Cabinet.

FIG. 3 is a front view of the Test Station showing the location of the Fixture 4, the Electronic Bay Front Panel 30 and the Removable Front Panel 32 which may easily be removed for access into the Test Station.

Figure 4:
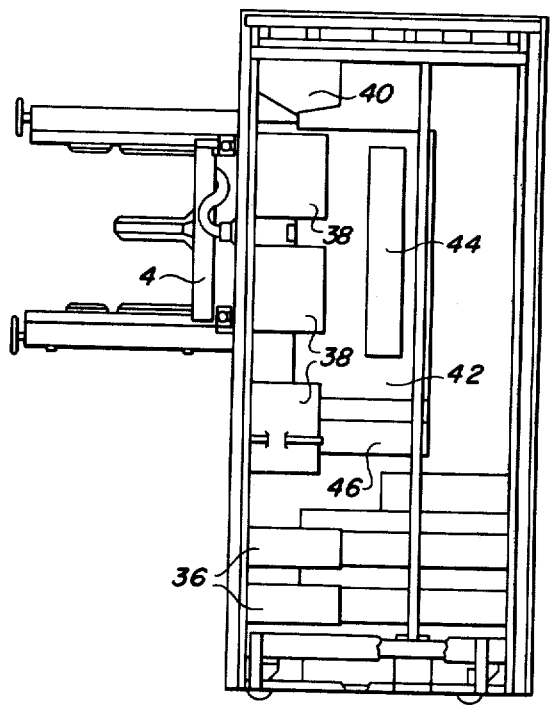
FIG. 4 is a cut-away side view of the Test Station showing the location of electronic components and the Fixture.

FIG. 4 is a cut-away side view showing the location of the Power Supply Drawers 36, each of which contains several module and Test Station power supplies, three component Brackets 38 on which are mounted relays and capacitors, and a High Voltage (+40 volts) Power Supply 40. The relays mounted on Brackets 38 are designed for 20 volts but operate too slowly at that voltage. Therefore, the relays are initially activated with 40 volts and subsequently held in with a 20 volt supply.

The Fan 46 supplies air through the Plenum to cool the Module Under Test. The pattern and Blocking Register Interface, the High Performance Board Interface, and Auxillary Connector Interface are mounted on the Subcontroller Assembly 42 and the High Performance Board terminating resistors are mounted on the High Performance Board Assembly 44.

Figure 5:
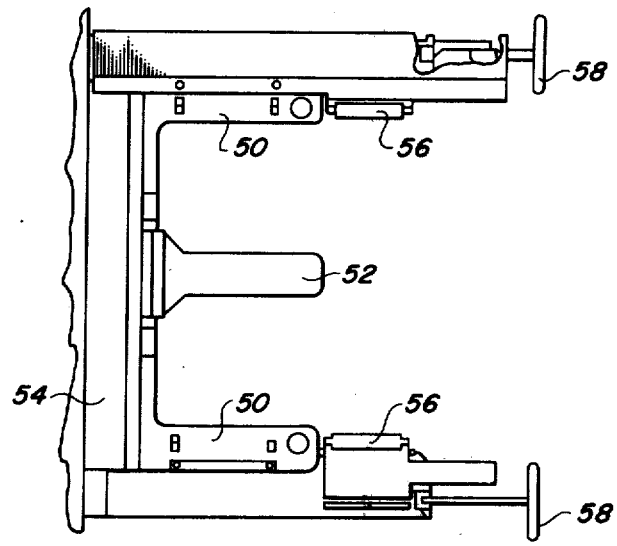
FIG. 5 is a side view of the Fixture.

A side view of the Fixture 4 is shown in FIG. 5. Module Guides 50 hold the Module Under Test. If a half-size board is being tested, it is held between the bottom Guide and the Moveable Module Guide 52. The Module connectors are mounted under the Solenoid Assembly 54 which also houses six solenoids for the zero-insertion-force Fixture connector, and pass and fail marker solenoids. If there are High Performance Connectors on the edges of the Module, they are mated with Connectors 56, driven by Handle Assemblies 58.

The arrangements shown in FIGS. 2, 3, and 4 simultaneously allow the operator access to the entire Module while preserving the functional environment in which the Module is allowed to operate normally. The Test Station has two other types of connectors in addition to the Fixture 4 for establishing a simultaneous interface to all Module connectors and drives these connectors directly from solid state interface circuits while supplying voltages and air cooling. This allows the Module to work in its normal environment while simultaneously being available to the test operator.

If a good Module Under Test is inserted into the Fixture 4, and tested, the successful completion of the test will be documented on the Module by a stamp. The Fixture 4 has a solenoid driven stamping apparatus which is automatically activated when a test is passed. On the other hand, if there is a failure, a hard copy output is automatically printed. These are the normal results in the production testing mode. However, there are special cases where the hard copy output does not specify a single integrated circuit, but specifies that the problem may lie in one of several areas. In cases where this kind of ambiguity exists, rather than to change every related integrated circuit, an effort is made by a test technican to isolate down to one integrated circuit the source of the fault.

Figure 6:
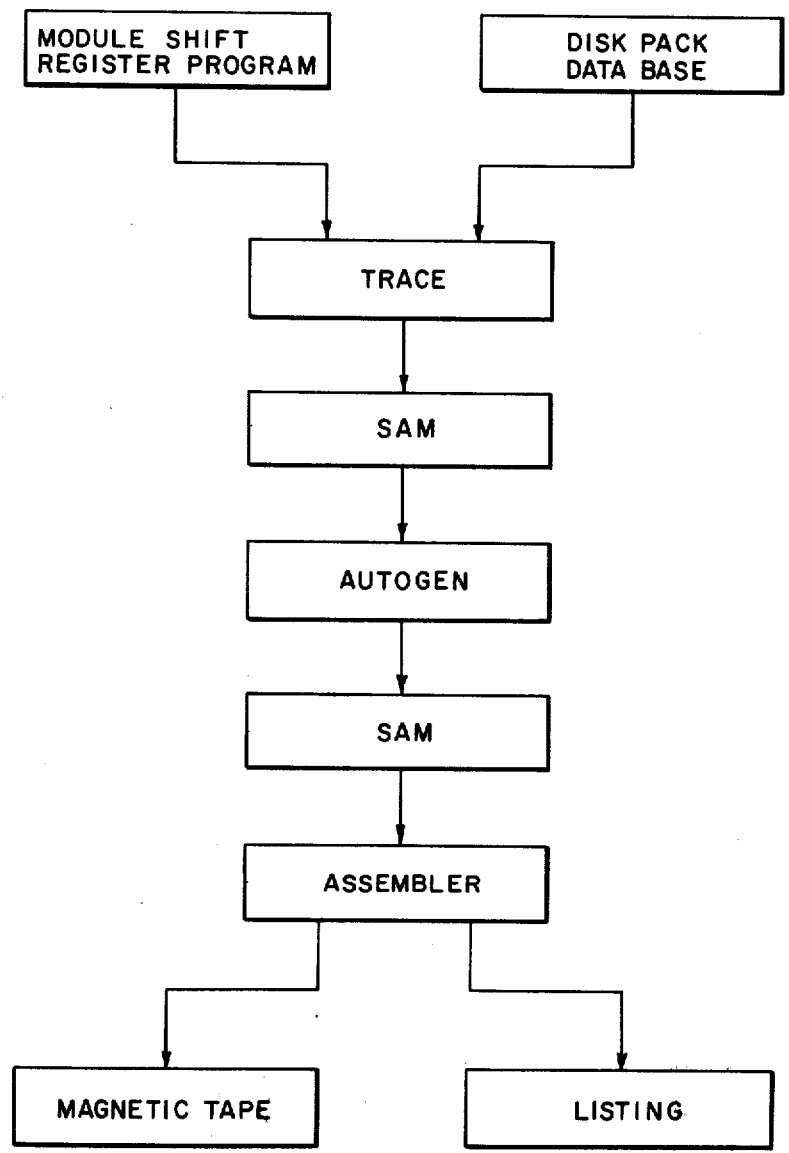
FIG. 6 is a simplified flow chart showing the off-line generation of test programs.

FIG. 6 is a flow chart of the off-line operations necessary to create test patterns and test programs. The system starts with the loading of the Module data base onto a disk pack. This data base is generated by ordinary data automation methods and represents the logic equations for all of the logic on the module. When the data base is complete it is submitted as a source of data to the test pattern and program generating software which is executed on a computer in the main computing facility. This work is not done on the Test System Computer 22.

The first test program and test patterns to be generated are the ones that test the diagnostic shift registers. There is subroutine that generates shift register test patterns but it is a general purpose subroutine and the specific details for the subroutine inputs must be provided by the test programmer. Furthermore, the test programmer must check the diagnostic shift register test patterns and program carefully because the entire subsequent test process is dependent upon the proper operation of the shift registers and the proper operation of the programs to test those shift registers since they are used as an extension of the Test System. Test patterns are generated which will be shifted into and out of the diagnostic shift registers at test execution time. At this point, a program is generated which will shift test patterns both left and right to determine that the diagnostic shift registers are fully operational.

The TRACE program next operates on the data base to partition the combinational network or networks on the board into the smallest possible discrete networks. Each network is defined as an output pin, all of the input pins whose data is required to determine that output pin state, and all of the logic that connects those inputs to that output. The output of a network may either be applied to a module connector pin or to the input of a flip-flop. Thus, the Trace program partitions the whole Module into the largest number of discrete networks. Since there is at least one discrete network for each output pin and since a large number of input pins and logic components comprise each network there is a large overlap between networks. This large degree of overlap is used to diagnose the specific faulty IC's since the fault must lie in the overlapping portions of all networks that show a failure.

The module analyst may intervene in the partitioning process. This may be necessary if it appears that some of the networks are large unmanageable, in which case the designer using the Store And Maintenance (SAM) program can manually enter information for partitioning a network into a set of smaller networks.

After the module analyst has satisfied himself that the Trace program has in fact partitioned the module under test into an optimum set of logic networks, each partitioned logic network, in the form of files generated by the SAM program is subjected to the Autogen program which generates the actual patterns necessary to completely test each of the above identified networks. This program also generates a fault table. Even for reasonably small networks, the production test patterns and Fault tables would be unmanageable if produced by a human programmer and therefore the production of these tests by computer is a necessity.

The patterns are generated on a path sensitised basis wherein the Autogen program goes through the entire network, node by node, and determine which particular input pattern will test a sensitized path from each input to the output, while simultaneously blocking out those parts of the network that are not essential to the testing of that particular node. Next, the Autogen program compares all of the overlapping characteristics of the input patterns in each network as well as the overlapping pattern of the networks themselves and generates a fault table that logically deduces from these test patterns which integrated circuit is at fault. Finally, the test program goes through and eliminates those tests that are redundant.

The SAM program is run again at this point to allow the module analyst to determine whether the pattern and fault table generation processes have been carried out correctly, and to load the test patterns into the previously generated files. If the module analyst is satisfied with the process at this stage, he will submit the patterns and programs thus generated to an Assembler. This Assembler works the way an ordinary computer assembler works in that a translation into computer machine language is effected. In this case the information received from Autogen is translated into a machine language program and data that may be loaded into the Test System Computer 22, wherein said data patterns and machine language instructions will constitute a program which when executed by the computer 22 will result in a set of specific instructions issued to the Test Station Controller to apply specific patterns to specific pins of the Module Under Test. The actual Assembler output consists documentation for this particular application program and the magnetic tape is in a form that may be loaded through the Magnetic Tape Unit 14 onto the Disk Pack 18 for use by the Test System.

As mentioned above, the generation of approximately nine thousand tests are necessary for the complete isolation of a fault in a large circuit module. Without an off-line pattern and program generation capability of this kind, the time for writing programs would be prohibitive, resulting in modules of high cost.

Figure 7:
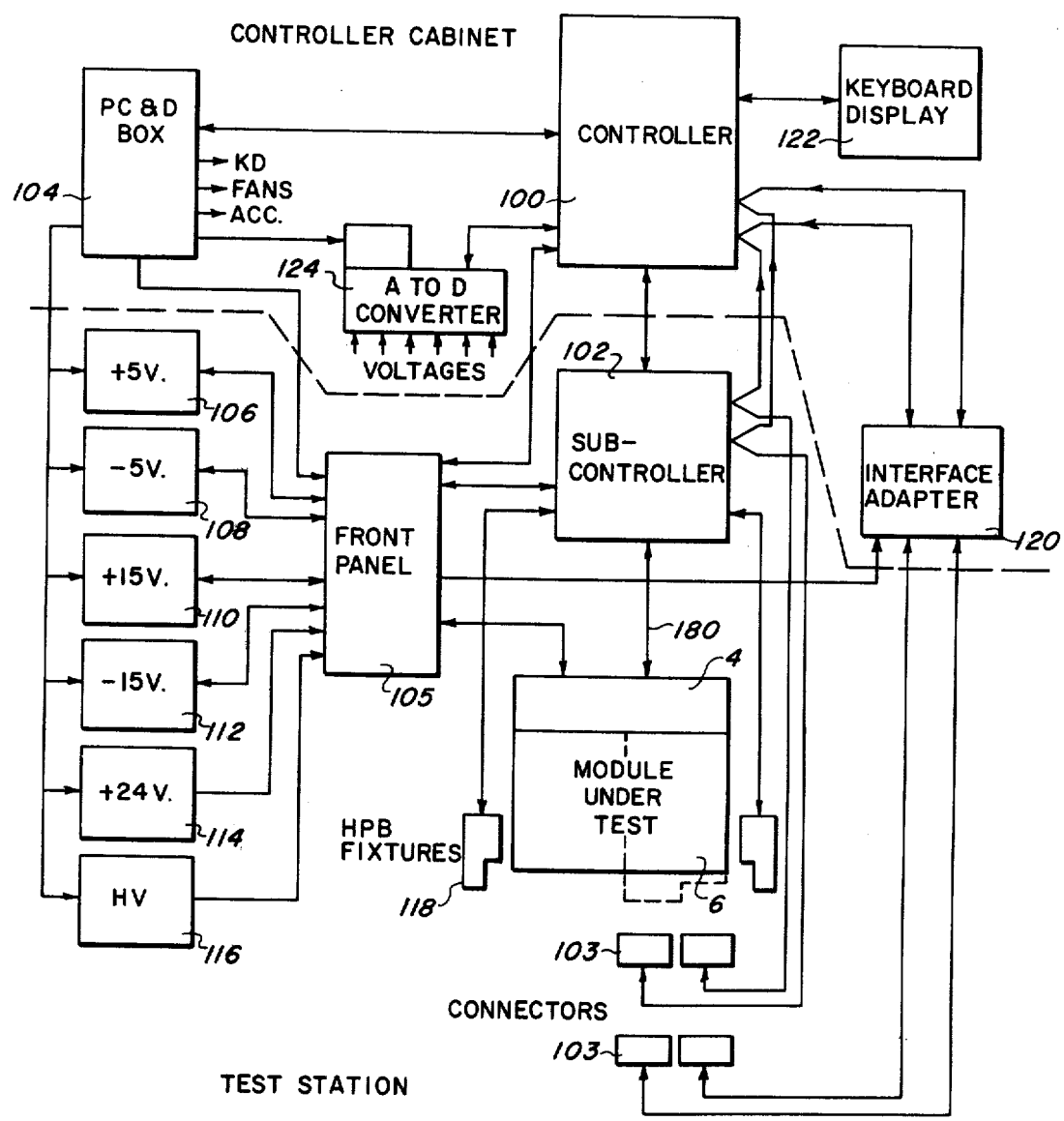
FIG. 7 is a block diagram of the Test Station and Controller Cabinet circuits.

FIG. 7 is a block diagram of the electronic components contained within the Controller Cabinet and the Test Station. The Controller can be viewed as a special purpose computer. It has a clock generator and produces both preparation phases and execution phases with its clock. It has seven registers and various interfaces which will be discussed in more detail below. It has a basic accumulator-like register, which in this embodiment is referred to as the D or Data Register, which may perform 15 bit data transfers between said Data Register and any 15 bit location of any other register in the Controller. In addition, the Data Register is capable of shifting data to the diagnostic shift registers on the Module Under Test.

The Subcontroller 102 in FIG. 7 has two functions, it serves as the interface between the Controller and the Module Under Test, supplying signals to the Fixture 4 as well as to connectors that mount onto the Module Under Test at its sides and end. The Subcontroller also generates the timing for the clock generator in the Controller. The subcontroller is located in the Test Station physically close to the Fixture to minimize transit time, race problems and distortions of input signals. The clock is generated in the Subcontroller for the same reasons.

The Power Control and Distribution Box 104 controls the distribution of a.c. and d.c. power. The three phases of line power are evenly distributed between the Keyboard Display, the Fans and Accessories and the Power Supplies. This Power Control and Distribution Box also has a 2.5 second delay timer which discharges the Five Volt Power Supplies going to the Module Under Test before the Fixture 4 is allowed to release the Module Under Test 6. This is necessary since the Module Under Test draws as much as 20 amperes and an electrical disconnection under load would result in arcing and rapid burn out of the Fixture and Module contacts. The discharge resistors are located in the Front Panel 105. The Power Supplies are on all the time but may or may not be connected to the Fixture through Front Panel relays. When testing for shorts on the Module these relays switch between power and ground. The +24 volt Power Supply and the HV Power Supply drives the relays, the rest supply power to the Module Under Test. The Power Control and Distribution Box 104 also has an interlock so that power cannot be applied to the Test Station and the Controller Cabinet without the Computer having been turned on first.

All of the power supplies 106 through 116 are provided with remote sensing wherein the sense resistor is located in the Front Panel 105 in close proximity to the Module Under Test 6, thereby insuring that the voltage at the Module Under Test will be accurate. Power Supplies 106 through 112, also may be programmed to allow for voltage margin testing at plus 10 percent and minus 7 percent.

The Fixture 4 into which the Module Under Test 6 is inserted, contains several accessories. The Module Guides themselves are adpated to guide either single or double length circuit boards into the Fixture 4. The Fixture is referred to as a "zero insertion force" Fixture because of its unique construction. A standard 52 pin printed circuit board connector is sawed in half lengthwise and the parts are mounted in the Fixture, and are driven by solenoids, springs and a pressure sensitive microswitch so that before a Module Under Test is inserted into the fixture the two halves of the connector are held apart a distance greater than the dimension of the Module. When the Module Under Test has been fully inserted into the Fixture, the pressure sensitive microswitch contacts will close energizing the solenoids and springs which will clamp together the two halves of the 52 pin printed circuit connector, making positive contact. In this way, a Fixture connector cna be produced such that there is almost no wear from friction produced by the insertion of the module while a positive contact is maintained on all connector pins for the duration of the test. This zero insertion force Fixture is necessary to support high volume production testing without wearing out the connectors involved. Two 52 pin connectors are mounted in the fixture and the module guides have been designed so that either single or double length Modules may be accomodated.

Another accessory of the Fixture is a solenoid and marking assembly. When a module successfully completes a test, the Computer issues a command to the solenoid which drives an ink marker against the Module Under Test. This mark on the board then becomes documentation of the successful completion of the test on the Module.

Because most modules are double length boards, a maximum of 100 signals plus power and ground may be conducted through the Fixture to the Module. In its operating environment the Module will be connected through these connector pins to back plane wiring and thus, the signals connecting the Subcontroller and the Module Under Test in this Test System are twisted pairs of wires carrying signals of normal TTL signal levels.

Some of the Module input and output circuits have high performance requirements. Cable drivers and receivers, for instance, are required to operate under more stringent speed and load parameters. Connectors for these signals are typically located at the edge of the Module Under Test. In this test system a High Performance Board Fixture 118 is provided for making connections between high performance circuits on the Module Under Test and the Subcontroller 102. These high performance connectors may have as many as 112 signal lines.

If the Module Under Test has edge contacts for two more sets of Connectors, 14 driver-receiver intes-unit cabling signal lines each, are provided. These signals are connected through an Interface Adapter 120 to the Controller 100 or directly to the Controller through the Subcontroller depending on the Module Under Test electronics used. the driver-receiver module in the Controller 100 is designed to receive signals from or send signals into a 33 ohm standard coax cable. Any other type of signals are converted by the interface Adapter and then fed to the Controller in a manner indistinguishable from that for the 33 ohm interface.

The character oriented Keyboard Display 122, in the preferred embodiment a Datapoint 3300, communicates directly with the Controller 100 and allows full test operator control of the test system as well as the ability to monitor the System and demand special modes of operation. A variety of information can be displayed on the Keyboard Display 122 including the test number, the mode of operation and a variety of error messages.

The A to D Converter 125 is a commercially available unit manufactured by Xerox Corporationas Model MD40. The inputs to the Converter are all of the Power Supply voltages and the voltages on the Module Under Test.

Figure 8:
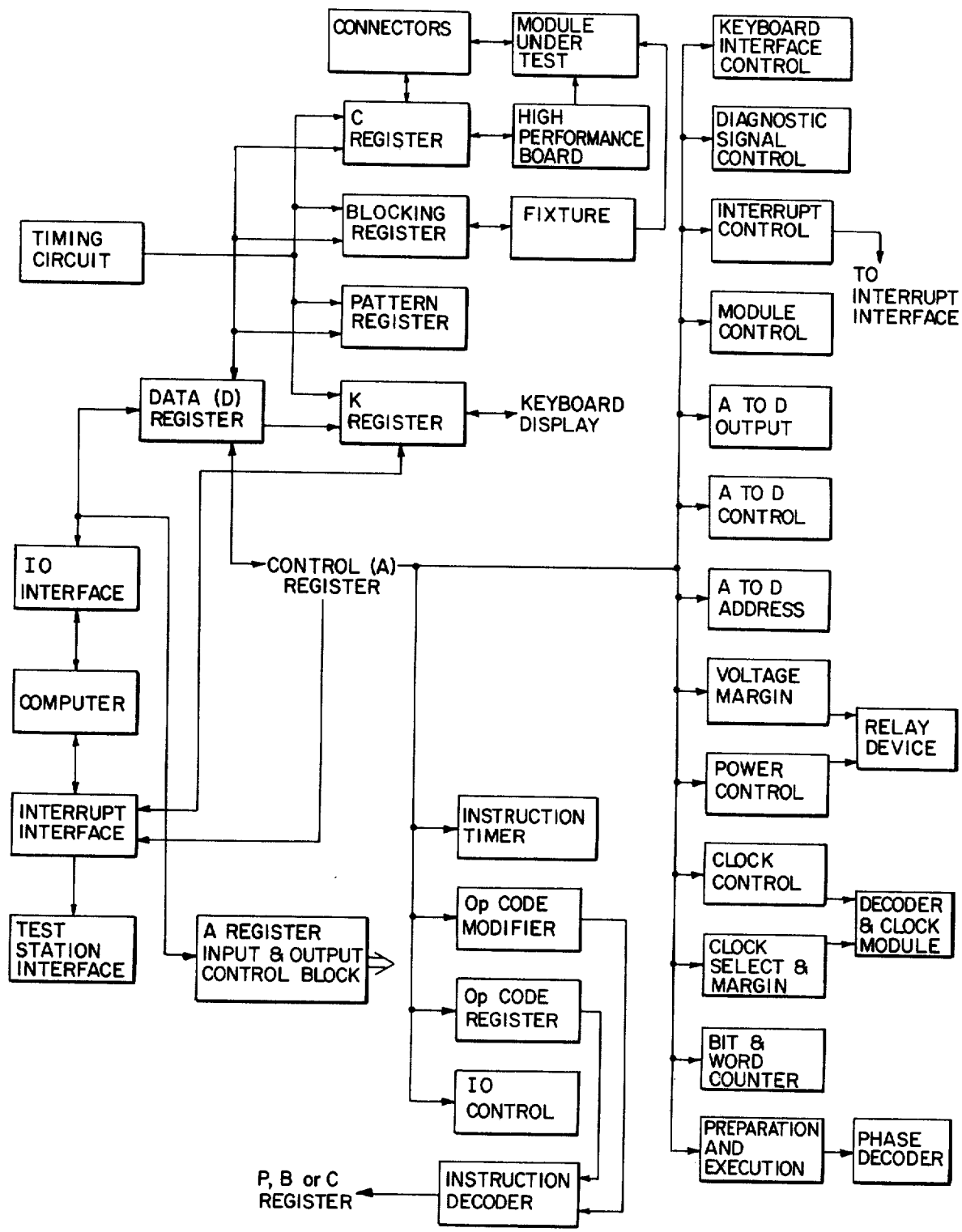
FIG. 8 is a detailed block diagram of the Controller circuits.

A block diagram of the Controller showing the signal paths between the computer, the Test Station and Module Under Test, are shown in FIG. 8. The two main registers are the D or Data Register and the A or Control Register. The data Register is the central register, and is fifteen bits wide. It is roughly equivalent to an accumulator of a computer and handles all of the data flow between the computer and the Module Under Test. It receives data from the IO Interface of the Computer and transfers this information to any one of the registers that further communicates with the Module Under Test or the Keyboard Display unit through intermediate registers which will be discussed below.

The one hundred eighty bit P or Pattern Register communicates with the connector on the Module Under Test through the Subcontroller and then the Fixture. This is the connector on the Module Under Test that would normally interface with the back panel wiring. The Pattern Register either outputs a "1" or a "0" pattern to the Module.

The 144 bit C Register performs a similar function for any other connectors that may be connected to the Module Under Test. These additional connections may be made through the High Performance Board and interface cable connectors.

The 180 bit B or Blocking Register determines for each bit of the 180 bit Pattern Register, whether the transfer of information will be to or from the Module Under Test. In effect then, the Blocking Register is actually a masking or blocking register which determines which bits will be transferred between the module Under Test and the Test Station and further, in which direction these bits of information will flow. The actual bits of information will be supplied through the Pattern Register if the signals are normally available at the back panel connector of the Module Under Test. Each bit of the corresponding Pattern and Blocking Registers is collector ANDed and jointly drives a twisted pair to the Subcontroller. If a B bit equals one, the corresponding bit of P is applied to the Module Under Test, whereas if B equals zero there will be no output from the Test Station to the Module Under Test, allowing the data path to transmit a data bit from the Module Under Test to the Controller. A simple schematic of this circuit will be discussed below.

The A or Control Registeris 153 bits wide and comprises a number of control flip-flops and registers, the data of which controls the operation of the Test Station and Controller. The single A Register in FIG. 2 is shown as 17 data fields. The Computer can change the contents of these fields by specifying the field and the data, both of which are communicated from the Computer through the IO Interface and D Register into the A Register. These A Register fields will be discussed below.

The K Register interfaces with the Keyboard Display Unit and the D Register. It is also connected through the Interrupt Interface to the Computer so that appropriate discrete "hand shaking" signals connect the Keyboard Display to the Computer. The protocol is standard and is documented in published specifications by the Datapoint 3300 vendor. There is a mismatch in that the Keyboard Display accepts and outputs information serially whereas the Computer accepts and outputs data 16 bits in parallel. Therefore, the K Register receives bits in parallel from the Computer and shifts out serially to the Keyboard Display, and likewise accepts serial information from the Keyboard and transmits it in parallel through the D Register to the Computer. These circuits are contained in standard modules which had not been developed specially for this use.

The IO Interface transmits information between the Computer and the rest of the electronic equipment. This communication line runs to the Computer CPU and does not communicate directly with the Computer main memory. This interface comprises 16 address lines, 16 data lines, two status lines, a functions strobe, and a write direct line.

The computer also communicates with the remainder of the Test System through the Interrupt Interface. This line of communication is used primarily by the Test Station Printer and the Keyboard Display. In general, the DIO Interface handles data transmissions between the Controller and the Computer automatically while the operator initiates communications between the Computer, the Keyboard Display, and the Printer through the Interrupt Interface. There are three kinds of interrupts. The general interrupt is for emergencies, in which case the operator can push a button which will automatically release the Module Under Test. The second interrupt is generated when a Module Under Test is inserted into the Fixture far enough to close the pressure sensitive microswitch. The third interrupt is the "interrupt-when-done" interrupt. This interrupt is generated at the completion of long instructions so that, in the interim the Computer is free to service the other Test Stations. These instructions are read and write direct instructions where long words are being loaded serially, bit by bit, into the diagnostic shift registers on the Module Under Test. Read and write direct opcodes are part of the regular vocabulary of the Computer and are normally used to command a read or write between the Computer memory and a peripheral storage device. In this case, the Controller is used as a peripheral and the command is relayed out to the Controller through the IO Interface.

The Controller is equipped with an 11.2 microsecond Timer which measures the time between the issuance of an op code to the Controller and the receipt from the Controller of the expected result. In a case where an input bit pattern of several hundred bits must be shifted into the Diagnostic Shift Register, or in a case where several hundred bits must be shifted out of the Diagnostic Shift Register before the one bit output of interest is available to the Computer, the 11.2 microsecond Timer will have timed out and the system must then wait for the interrupt-when-done.

A Keyboard interrupt is generated whenever information must be sent from the Keyboard Display to the Computer.

FIG. 8 shows the fields contained within the A or Control Register which information is sent out on control lines to control the Controller and Subcontroller. The loading of these bits is controlled by the A Register Input and Transfer Control block which is itself loaded through the IO Interface from the Computer. This A Register Input and Transfer Control Block determines which portion of the A Register will be enabled for parallel loading of data received from the IO Interface.

The first field of the A Register is the IO Control field which stores all of the bits pertaining to the IO Interface control functions. For instance, a bit may be set when the Computer is executing a write direct instruction, when the IO Interface is busy, when there is a procedure error such as if the Module is not inserted, if a measurement is being taken out of range of the measuring instrument, or if there is an improper instruction being executed.

Although the A Register comprises 17 fields as shown in FIG. 8, these fields are not separated in the hardware but are groups of bits that share a commonality of function. In a schematic the A Register would appear as twelve fields each of which would have 15 bits for a total of 180 bits. Functionally, only 153 of these bits are used and they are divided into 17 functional fields. The IO Control field, for instance, has seven flip-flops or bits, not necessarily contained in one 15 bit section of the A register. They may, in fact, be spread out over several 15 bit sections of the A Register. However, these seven bits are common, functionally, in that they all reflect the status of the IO Interface, and thus may conveniently be discussed together.

If the write direct bit is set, the IO Interface contains information which is to be output to the Test Station. If the read direct bit is set, the IO Interface is waiting to be loaded with information from the Test Station for ultimate transmission to the Computer. If the illegal instruction bit is set, then the IO Interface ignores the data coming in from the Test Station. Likewise, if an illegal op code bit is set, that instruction will not be executed by the Test Station. Thus, the IO Control field contains IO Interface status information.

The next two fields are the Op code Register field and the Op code Modifier field. The contents of these two fields are sent to the Instruction Decoder as inputs and the Instruction Decoder output is addressing information sent to one of the other registers in the Controller These Op codes can either be read or write instructions and are properly decoded after the receipt of a read direct bit or lack. More specifically, whether the next instruction is a read direct or a write direct instruction will be apparent from the Op Code sent from the IO Interface to the A Register. However, the read and write direct instructions are common execpt that the read direct bit comes from the IO Control register. The Op Code arrives at the A Register through the IO Interface as part of an Op code block from the Computer. The Op code modifier is needed since there is such a large number of registers in the Test Station Controller and also because each register contains many addressable subfields within it. The B and P Registers for instance are each one hundred seventy bits within which the 15 bits of information coming through the IO Interface must be situated. The addressing of all these registers requires that a separate field need be assigned to differentiate between portions of each register.

For every Computer instruction that may result in a Test Station function, there is an object code assigned and assembled by the Test System off-line Assembler, and the Instruction Decoder section of the A or Control Register is a circuit which translates this Op code into a set of instructions specific to the Controller which go out on the outputs of the Instruction Decoder to the appropriate sections of the Controller registers. The Test Station Op codes, therefore, are not typical computer Op codes but ae special Test Station Op codes that were specifically assembled for use of the Controller in manipulating itself and the Module Under Test.

The IO Interface transmits two kinds of information, 16 bit address information, and 16 bit data information. The data bits go directly to the D Register or the A Register. The 16 address bits go to the OP Code and the Op Code modifies and are in turn translated through the Instruction Decoder into a set of bits specifying instructions as well as locations on the Module Under Test. The Instruction Decoder is therefore a variety of standard decoder which translates from 16 address line inputs into several hundred back panel outputs. Thus, the instruction is really addressing information, which specifies 15 pins at a time out of several hundred pins on the module. The 16 address lines contain information in the form of $2nab$ where $n$ is a subfield specifying any one of three Test Stations, ($a$ is 2 which specifies that this word is an Op Code), and $b$ is the Op Code modifier. All of the four fields are four bits each so that the resultant word is 16 bits wide.

The B, P and C Registers are driven by a Timing Circuit. All of the flip-flops in the P, B, and C Registers are implemented from latches rather than flip-flops because of hardware cost considerations, and therefore a slightly more complex timing mechanism is required to drive these registers. This Timing Circuit is used to control and clock the latch circuits, and therefore determine which particular set of latches will be receptive to information input from the D Register. The Timing Circuit output is used in conjunction with output lines from the Instruction Decoder to select which bits of the P, B, and C Registers will be loaded.

The next section of the A Register is the Instruction Timer field. It is normally set at 11.2 microseconds and is implemented as a counter. Most instructions may be executed witin that period of time. However, there are special instructions that take much longer. For instance, a single output bit may be several hundred bits away from the output pin on the Module Under Test Diagnostic Shift Register and therefore and the several hundred bits must be shifted out before the one bit of interest is available to the Test Station. This will, of course, far exceed 11.2 microseconds, and under these conditions, the timer will be disabled and an interrupt generated when the bit of interest becomes available.

The next field within the A Register is the Preparation and Execution field. Each instruction requires from five to 16 clock phases, separated into preparation phases and execution phases. In the preparation phases data is loaded into the D Register or the A Register. For each instruction a necessary sequence of phases is specified, phase by phase. These control bits go to the Phase Deocder which supplies control lines to the circuits which must be controlled.

The next field of the A Register is the bit and word counter. This is a special purpose counter used to count the number of bits being loaded into or read out from the Diagnostic Shift Register on the Module Under Test. Each word in the Diagnostic Shift Register is 15 bits long, therefore, to look at bit 17 the word counter would be set to two and the bit nummber to two. There can be a maximum of 200 Diagnostic Shift Register bits per Module Under Test.

The next field of the A Register is the Clock Select and Margin field. Two kinds of clocks are available, one initiated by the Test Station Subcontroller and the other initiated by the Computer. Either of the two may be selected under operator control at the beginning of the program.

The next field is the Clock Control. The clock may either be run in a single step mode, where only one clock at a time is issued to the module, or the clock may be free-running. A single clock is used when data is being loaded in parallel into the Diagnostic Shift Registers. Furthermore, the single clock circuits can be used with a counter so that a specific number of clocks may be issued to the Module Under Test. A margining of the clock frequency can also be controlled through this Clock Control register. The clock select and margin bits and the clock control bits go to the Decoder and Clock Module which decodes the outputs and sends them to the Module Under Test.

The next field of the A Register is the Power Control which applies power to the Module Under Test, and is also used to the ground specific pins while performing tests for shorts on the Module Under Test. The next field is the Voltage Margin. Voltages, as controlled by this field, may be set at margins which normally are either 10% high or 7% low. These signals go to the relay drives on the Front Panel where the power supply programming resistors are located. These programming resistors sense the voltage at the Module and feed back voltage correction signals to the Power Supplies. These programming resistors, or sensing resistors, are located in the Front Panel very close to the Module Under Test to ensure accuracy of the voltages at the Module Under Test. Various precision resistors which are used to set the various margined voltages are relay selectible.

The next three fields of the A Register are related to the Analog to Digital Converter. All of the Power Supply voltage outputs are monitored at the Analog to Digital Converter. These voltages are available at the Converter input, which comprises a solid state multiplexer, which can select any one of the several Power Supply outputs being monitored. The A to D Converter Output field is the field which addresses the Converter multiplexer. The Converter output is a twelve bit output indicating the voltage in digital form. The A to D Converter Control field contains read information, two of the modes are "red" and "busy" which information, when relayed to the computer, indicate whether the Converter is available for a reading or whether it is busy.

The next field is the Module Control field. This tests to see if the Module is properly inserted in the Fixture as determined by the pressure sensitive microswitch. If the microswitch contacts are not closed, then any Op code that is attempted to be executed will result in an illegal operation indication The next subfield is the Interrupt Control field, the output of which goes to the Interrupt Interface. This is a four bit field which contains information on which interrupts are presently active for this Test Station. The next field is the Diagnostic Signal Control field containing ten outputs to control lines that eventually connect to the Module Under Test. Every module that has been designed for automatic testing on this Test System has 11 dedicated pins set aside for controlling the diagnostic circuits and signal flow paths required for fault detection and fault isolation by this Test System. The inputs to these eleven dedicated pins are contained in this register. These control lines determine whether the diagnostic shift register will shift right or left, will decide whether the diagnostic shift registers will be loaded serially or in parallel, whether information will be taken out of the Module as the result of a left shift or a right shift into the Test Station, and one line is provided for serial transmission of data between the Test Station and the Module Under Test. Other control lines instruct the Module Under Test whether it is being used in the Diagnostic Shift Register mode or in its oridinary logic mode, and instruct the Module Under Test whether it is receiving a test clock or a normal clock. Finally, there is one signal which indicates to the Module whether it is being tested in the Test Station or whether it is being tested in its operational environment. This last signal may be explained as follows. Let us assume that the particular Module Under Test has been designed for eventual use in a peripheral device. Normally, this board would be tested by disconnecting it from that peripheral device and inserting it into the Test System as the Module Under Test. An alternative method of testing this board would be to test it in place in the peripheral by applying test signals to its back plane wiring. In the event that the circuits on the Module Under Test may have to be reconfigured slightly for this kind of in-place testing, this last mentioned signal could be used as a control line to command this reconfiguration. In fact, in the preferred embodiment of this Test System, this in-place testing capability has not been developed but an appropriate pin has been dedicated on the Module to allow for future expansion of this facility. One advantage of in-place testing is that power supply voltages and other structural and electrical inputs need not be supplied by the Test Station. This signal line will also be used to address only one module out of all modules in the peripheral unit in the example. Thus, the peripheral modules may be reconfigured and tested one at a time. Anotherbit in this Diagnostic Signal Control field is used as the data pattern input line to the Module Under Test. For instance, to load 14 "one" bits into the diagnostic shift register, this line would be set high and 14 clock pulses issued to the Module Under Test.

The last field in the A Register is the Keyboard Interface Control. As mentioned above, there is a constant change between parallel and serial operation in the K Register since the Keyboard is a serial device and the Computer is a parallel device. The control signals for this operation originate in the D Interface Control. As stated above, techniques and circuits for the interfacing of data between a Computer and a Keyboard Display are well known in the art.

Figure 9:
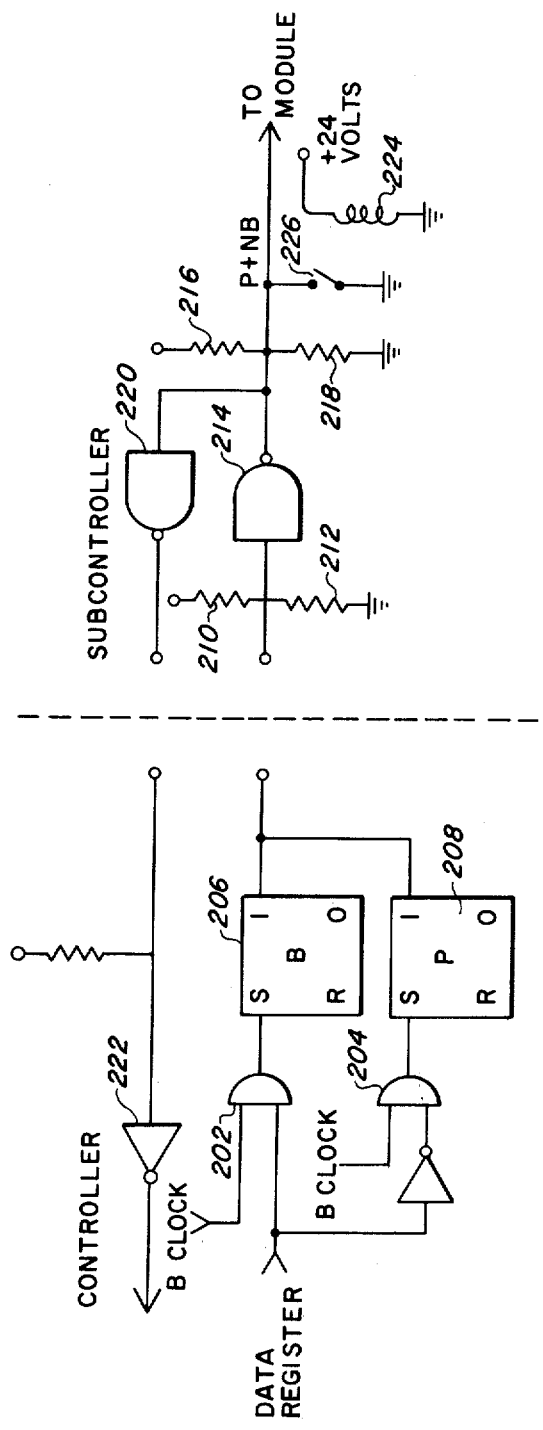
FIG. 9 is a schematic of one bit of the Blocking and Pattern Register electronics.

FIG. 9 is a schematic representation of the circuits involved in the transmission of one bit of data between the Data Register and the Module Under Test. One bit of B Register information is loaded through gate 202 into flip-flop 206 while one bit of P information is loaded through gate 204 into flip-flop 208. Flip-flops 206 and 208 are necessary to store the P and B information since a variety of information is transmitted through the D Register necessitating the particular B and P bits to be clocked into a memory device, in this case a flip-flop, in order to be available when needed. The outputs of flip-flops 206 and 208 are collector ORed and are passed on through the intersection of resistors 210 and 212 to gate 214 which drives the signal past resistors 216 and 218 into the data input pin of the Module Under Test. If the data pin at the Module Under Test is intended at this moment to be used as an output pin rather than an input pin, flip-flop 206 will be held low causing the output of gate 214 to be held high. Thus, gate 220 will be sensitive to any output from the Module Under Test data pin and that signal will be transmitted through Driver 222 to the D Register. Simultaneously with the operation of these circuits, appropriate clock pulses will be supplied to the Module Under Test to allow for the data information to be clocked into or out from the Module Under Test. It should be noted that the P, B, and D Registers are located in the Controller, Gates 214 and 220 are located in the Subcontroller of the Test Station, and the signal from the Subcontroller is finally applied to the Module Under Test connector pin. The Relay 224 and its Contact 226 are used to test the Module Under Test for Voltage shorts. This is done by shorting out all pins but one voltage pin to ground and then testing for an appropriate voltage level of that particular voltage pin.

Figure 10:
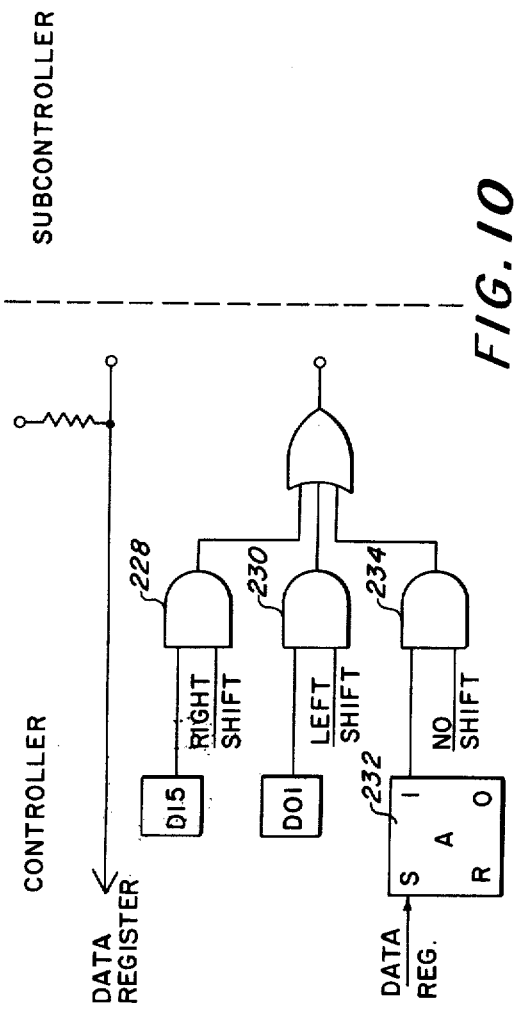
FIG. 10 shows the circuits for serial loading of a Module Diagnostic Shift Register.

The eleven connector pins on the Module Under Test dedicated to the diagnostic functions are driven by the circuits shown in FIGS. 10, 11 and 12.

On the Module Under Test, the diagnostic shift registers, with a capacity of up to several hundred bits, are connected in a circular fashion and may be loaded serially from the input connector pin on the module. These patterns are received by the Test Station from the computer through the IO Interface and into the D Register 15 bits at a time. Thus, it can be seen that to load 150 bits into the Diagnostic Shift Register on the Module will require 10 iterations wherein the D Register is loaded in parallel from the Computer and then unloaded serially into the Module Under Test. Furthermore, control lines specifying whether the data should be shifted left or right into the Diagnostic Shift Register are also required. These functions are performed in the circuits shown in FIG. 10 where Gate 228 and Gate 230 are connected to either end of the D Register and Flip-Flop 232 is one bit of the A Register Diagnostic Signal Control field that controls the data pattern of Diagnostic Data when the D Register is not used, i.e., neither the right shift nor left shift control line will be high. As indicated previously in FIG. 8, the module test patterns are received through the D Register and from there into the P and B Registers for ultimate application to the Module Under Test. The test pattern input/output pin on the Module Under Test is also connected to the line in the upper part of FIG. 10 where the signal received from the Module Under Test is transmitted to the D Register for monitoring and ensuring the proper operation of the Test Station.

The Diagnostic Data Out pin on the Module Under Test is connected, in FIG. 11, to Gate 236. The output is transmitted through Buffer 236 to Gates 238 and 240 which, under control of either a left shift or a right shift command will load data into the least significant or most significant end of the D Register in bit serial fashion. The last bit is also available to the D Register for monitoring as explained above.

All of the diagnostic signals are transmitted from the D Register to the Module Under Test through circuits shown in FIG. 12. Each diagnostic bit in the D Register is clocked into a bit of the A Register 248. This is necessary since the D Register is continuously used by various parts of the Test Station for various purposes whereas the A Register Diagnostic Signal Control field must maintain its outputs for the duration of each test. Each bit is then available through Drivers 242 and 244 through the resistive network and test relay to the Module Under Test. Two Drivers are used here because of a fan-out requirement. This same signal is also available as an input to Gate 246, and is available for monitoring by the D Register as explained above.

Figure 13:
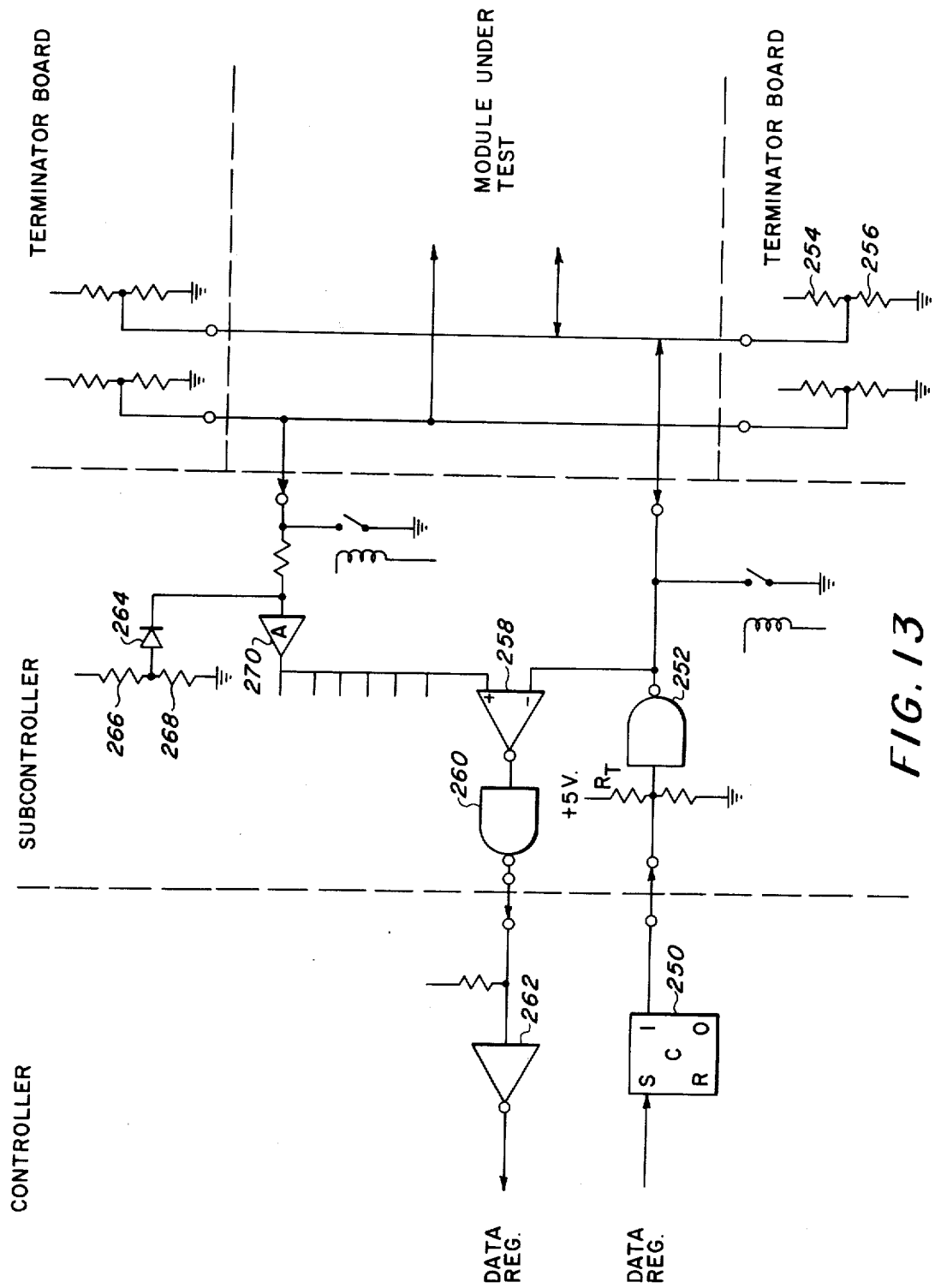
FIG. 13 is a schematic of the High Performance Board.

FIG. 13 is a schematic of the circuits driving the High Performance Board. In this case, 120 pins on an edge connector of the Module are supplied with signals from the D Register through the C Register. Each bit of the data pattern is transmitted from the D Register into the C Register Flip-Flop 250. From there it is transmitted to Driver 252, through the proper terminating resistors 254 and 256, and is applied to the Module Under Test.

If the High performance pin is to be used as an output from the Module rather than an input to the Module, the signal is felt at Discriminator 258 and is applied to Gate 260 in the Subcontroller and Driver 262 in the Controller. Because this is high data rate information, the threshold voltage, distinguishing between a logical zero and a logical one, is set at 1 volt instead of the normal 2.5 volts. Therefore, a discriminator 258 with a 1 volt threshold input is required. The 1 volt reference level is applied to the Discriminator 268 and Amplifier Circuit 270 which drives the entire set of Discriminators.

These circuits enable outputs from the Module Under Test to operate at data rates much higher than those possible through the back plane wiring and also allow signals to be driven through 15 foot cables. In contrast, back panel wiring, as supplied through the fixture, is typically used for ordinary logic level signals which run from one module to another.

FIG. 14 is a block diagram of the circuits driving the Auxillary Connectors. Each data bit comes from the Computer through the IO Interface and through the D Register and is clocked into the C Register Flip-flop 272. The driver/receiver module in the Controller is implemented with emitter follower output and if the logic on the Module Under Test is compatible, then a direct connection is made between the Controller and Auxillary Connector 274 and 276. Otherwise, the signals to and from the Controller must be sent to Adapter Interface Modules 278 for conversion to the right logic levels before application to Auxillary Connectors 280 and 282. Also applied to these same pins are Relay Contacts 284 which are used in connection with the short tests. Two sets of two connectors are shown since there are two Auxillary Connectors per Module Under Test.

In normal operation the Test System can execute about 75 tests per second. The clock rate is three megahertz and the execution of 10 or 15 microinstructions, in the form of preparation phases and execution phases, are required to set up one test pattern. In general, the information is clocked from the Computer into the D Register, and at that point a determination is made as to what the particular instruction sequence will be, either to produce a pattern for the Module Under Test or to receive information from the Module Under Test for retransmission to the Computer.

There are also maintenance and calibration modes of operation where programs may be executed manually, instruction by instruction. Also, instructions may be entered by hand and executed in single-step fashion. This is useful since it takes a significant amount of turn-around time to write and assemble a test tape, so that an experimental sequence of instructions conveniently may be entered and executed manually to provide the proper operation of the program before submission for a regular tape through the assembly process.

There is also an automatic test program which tests the power supplies of the Test Station and some parts of the logic circuits. In addition, the self-test module performs continuity tests of the fixture contacts. This is done by plugging a test module into the Fixture and connecting the High Performance connectors and Auxillary Connectors. The test module has connections from one contact to another and continuity may be tested in this fashion. The self-test module also contains load resistances for drawing appropriate amounts of current to test the Power Supply current handling capabilities.

This Test System invariable finds and diagnoses stuck-at-zero or stuck-at-one faults and will usually diagnose the fault down to one or several IC's. Solder bridges and other forms of accidental interconnections between circuits and shorts are not necessarily found. Also, dynamic failures will not be detected by this Test System. Tha is, a Module that is faulty in that it will not produce the proper output fast enough will appear not to have a fault to this Test System since there is no provision for timing the input to output delay of the circuits. These dynamic problems are frequently created by missing or open pull-up resistors, and to the extent that these faults can not be modeled as a stuck-at-one or stuck-at-zero faults, the test will not diagnose these. It is also possible that several stuck-at-one and stuck-at-zero faults may together cooperate to defeat the diagnostic testing. However, this has not been found in actual practice since complementing or correcting problems would be an indication of redundant logic, and redundant circuits have not been used in this equipment.

In the case where a solder bridge may couple together three or four IC's, the repair order printout will probably specify five 10, or even more IC's as possible being at fault. The test operator soon becomes accustomed to this kind of read out and usually can detect the problem as being a solder bridge between the related IC's rather than interpreting the printout that all the IC's are suspect. While the test system does not necessarily find solder bridge problems it almost always does since, from the multitude of tests that are required to be run through the same IC, not only to test that IC but also to set up test conditions for some other IC, there is bound to be a condition that exposes the solder bridge as a fault. The situation where the test system has not discovered a single stuck-at-zero or stuck-at-one error has not occured.

Typical test time is between 2 and 4 minutes when the Test Station is not being time-shared.

The Test System may be run in a trouble-shooting mode as well as a production mode. In the trouble-shooting mode, the operator may specify the program to either stop on error, stop on a particular instruction, stop on a particular test, or loop on a particular test. This capability allows the test operator to use the Test System to set up a particular set of inputs so that he may diagnose the fault with a meter or oscilloscope.

There is also a calibration mode used in conjunction with the self-test module where the Computer will exercise a calibration and self-test program to ascertain the proper workings of the Computer and Test Station.

It is to be understood that the above described test system is merely illustrative of the principles of the invention. While a particular preferred embodiment of the present invention has been described and illustrated, it will be apparent to those skilled in the art that changes and modifications may be made therein without departure from the spirit and scope of the invention as claimed.

What is claimed is:

1. In a test system for automatic testing and fault isolation of digital circuit modules wherein the execution of a computer program generates test bit patterns and instructions specifying the module pins to which said test patterns should be applied, and where said computer analyses said module outputs resulting from the application of said test bit patterns to determine the circuit at fault, and wherein said digital circuit module to be tested contains a plurality of flip-flops electrically coupled to a plurality of connector pins and may receive test inputs in parallel through a plurality of module connector pins or serially into a shift register through one module connector pin, the improvement comprising:
   a data register for receiving and storing portions of test bit patterns and instructions from said computer and for transmitting to said computer for analysis portions of said module output,
   a blocking register having one bit coupled to each module pin for receiving from said data register and storing portions of said test bit pattern, which pattern when stored in said blocking register, defines which module pins are input pins and which are output pins,
   a pattern register having one bit coupled to each module pin and to each blocking register bit for receiving from said data register and storing portions of said test bit pattern, which pattern comprises the test bit pattern input to said module, and for applying said bits to said module pins defined by said blocking register as module input pins,
   a first circuit coupled to each module pin for transmitting a portion of said module outputs to said data register in parallel,
   a second circuit for transferring portions of said test bit patterns from said data register to said module shift register serially and for transferring portions of said module outputs from said module shift register to said data register serially,
   a decoder, responsive to said instructions and coupled to each bit of said pattern and blocking registers for transferring portions of test bit patterns from said data register to a portion of said pattern and blocking registers, and
   module test means on said digital circuit module controlled only one bit of said test bit pattern generated by said computer and coupled through said data register and pattern register for reconfiguring said digital circuit module flip-flops between their normal circuit configuration and a shift register configuration whch can be serially loaded from one of said connector pins.

2. Apparatus for testing and fault isolation of digital circuit modules, said modules comprising digital circuits containing flip-flops electrically coupled to a plurality of connector pins, said apparatus comprising:
   module test means on said digital circuit modules controlled by a control signal received at one of said connector pins for converting said flip-flops between their normal circuit configuration and a test shift register coupled at one end to one of said connector pins,
   a computer for transmitting test bit patterns to be used as inputs by said module, for transmitting instructions to specify the module pins at which said test patterns shall be applied and at which the resultant module outputs shall be available, and for receiving said module outputs to determine the particular circuit at fault, and
   test station means coupled to every module pin for receiving and storing said instructions and test bit patterns from said computer, for coupling one bit of said test bit pattern to said module test means as said control signal, for coupling said test bit patterns and module outputs between said module connector pins and said computer, said coupling of said test bit patterns and module outputs between said test means and said module being in parallel through said plurality of connector pins and in series by shifting said test bit patterns and module outputs through one of said connector pins coupled to one end of said shift register, wherein said test station means further comprises: a decoder coupled to every module connector pin, responsive to said instruction for determining which of said module connector pins shall be used as module input pins and which shall be used as module output pins, wherein said decoder further comprises:
- a data register for receiving, storing and coupling said test bit patterns, said instructions, and said module outputs between said computer and said module,
- first circuits for coupling said test bit patterns and said module outputs between said data register and said module in parallel, and
- second circuits for coupling said test bit patterns and said module outputs between said data register and said module serially, wherein said first circuits further comprise:
- a blocking register for receiving and storing test bit patterns from said data register indicating which of said module pins are to be implemented as inputs and which are to be implemented as outputs for each module test, and
- a pattern register for receiving and storing test bit patterns from said data register, said pattern register being coupled to said blocking register to apply said test bits only to module pins which are to be used as inputs in accordance with said blocking register contents.

3. Apparatus for testing and fault isolation of digital circuit modules comprising digital circuits containing a plurality of flip-flops electrically coupled to a plurality of connector pins, said apparatus comprising:
- a computer for generating test bit patterns to be used as test inputs by said module, for generating instructions specifying the module pins to be used as input pins and output pins for the test, and for receiving and analyzing the resultant module outputs to determine the particular module circuit at fault,
- a data register for receiving and storing said test bit patterns and said instructions from said computer and for transmitting said module outputs to said computer, and
- test circuit for storing said test bit patterns and for coupling said test bit patterns to said module from said data register and for coupling said module outputs from said module to said data register in accordance with said instructions, and
- module test means on said digital circuit module controlled by one bit of said instruction generated by said computer and coupled through said data register and said data register and said test circuit to one of said module connector pins, said module test means for allowing said test bit patterns and module outputs to be transferred between said plurality of flip-flops and a plurality of connector pins in parallel or for reconfiguring said plurality of flip-flops into a shift register and coupling said test bit patterns and module outputs between said shift register and one of said connector pins in series, wherein said test circuit comprises:
- an input register for storing test bit patterns for use as inputs to said module and for coupling said test bit patterns to said module input pins in parallel,
- first circuit for coupling test bit patterns and module outputs in parallel between said module and said data register, and
- second circuit for the serial coupling of test bit patterns from said data register to said module and for the serial coupling of module outputs from said module to said data register, wherein said input register further comprises:
- a blocking register for receiving and storing a test bit pattern from said data register and coupled to said first circuit and said module to implement each module pin to be used either as an input or output pin, and
- a pattern register coupled to said data register for receiving and storing a test bit pattern for said module, and coupled to said blocking register and said module for coupling said test bit pattern to those module pins specified as inputs by said blocking register contents.

4. The apparatus of claim 3 wherein said blocking register and said pattern register each have a bit coupled to each pin of said module and wherein said apparatus further comprises:
- a control register for receiving and storing from said data register said instruction, and
- a decoder responsive to the contents of said control register for determining which bits of said pattern register and blocking register will be loaded from said data register.

5. Apparatus for performing tests for proper operation on a digital circuit module containing a plurality of flip-flops electrically coupled to a plurality of connector pins, and for isolating faults thereby detected by applying test bit patterns to the input pins of said module and analysing the resultant module outputs comprising:
- a computer program comprising said test bit patterns, instructions defining the module pins to which said test bit patterns shall be applied, and instructions for analysing the outputs of said module to isolate a fault detected to an individual integrated circuit chip,
- storage means for storing said test bit patterns and instructions in a form immediately available to a computer,
- a computer, including a main memory, coupled to said storage means for transferring said computer program for testing said module to said main memory and for executing said program,
- loading means under control of said computer and coupled to said storage means for loading a computer program into said storage means,
- a test station electrically and mechanically connected to all pins of said module,
- a test station controller under control of said computer and coupled to said computer and said test station for receiving said test bit patterns and said instructions defining the module pins to which said test bit patterns shall be applied, for storing said test bit patterns and instructions for the duration of the test so that said computer is available for other tasks, for transmitting said test bit patterns to said test station, for decoding said instructions from said instructions from said computer onto control lines coupled to said test station to apply said test bit patterns to the defined module pins, for receiving the resultant outputs of said module from said test station, and for transmitting said module outputs of said computer for said analysis, and module test means on said digital circuit module controlled by one bit of said instruction generated by said computer and coupled through said test station to one of said module connector pins, said module test means for allowing said test bit patterns and module outputs to be transferred between said plurality of flip-flops and a plurality of connector pins in parallel or for reconfiguring said plurality of flip-flops into a shift register and coupling said test bit patterns and module outputs between said shift register and one of said connector pins in series, wherein said test station controller comprises:
  a data register coupled to said computer for receiving and storing a plurality of test bits representing a portion of said test bit pattern,
  first circuit coupled to said data register and said module for transmitting said portion of said test bit pattern in parallel to said test station for application to said module pins, and to transmit from said module to said data register, in parallel, a portion of said module outputs,
  second circuit coupled to said data register and said module for transmitting said portion of said test bit pattern serially to said test station for application to said module pin, and to transmit from said module to said data register, serially, a portion of said module outputs, and
  a decoder, responsive to said instruction, and coupled to all module pins and to said first and second circuit for receiving and storing said instruction from said data register and for determining which module pins will be input pins and which shall be output pins, wherein said test station controlled further comprises:
  a pattern register coupled to said data register and to said test station for applying through said test station to said module an entire test bit pattern to the input pin of the particular network of said module under test, said test bit pattern having been received in portions from said computer through said data register, and
  a blocking register coupled to said data register and collector ORed to said pattern register for determining whether each module pin will be used as an input to said module, said data register contents having been received in portions from said computer through said data register.

6. The apparatus of claim 5 wherein said decoder is coupled to said pattern and blocking registers through control lines for controlling the loading of a test bit portion into a portion of the blocking register whereby each module pin assumes an input or output function, and for controlling the loading of a test bit portion into a portion of the pattern register whereby each input module pin is driven by its test bit.

* * * * *